United States Patent [19]

Stodt

[11] Patent Number: 4,802,375

[45] Date of Patent: Feb. 7, 1989

[54] CHANGE-SPEED GEARBOX

[75] Inventor: Enno Stodt, Heidenheim, Fed. Rep. of Germany

[73] Assignee: J. M. Voith GmbH, Fed. Rep. of Germany

[21] Appl. No.: 112,508

[22] PCT Filed: Nov. 26, 1986

[86] PCT No.: PCT/EP86/00684

§ 371 Date: Aug. 3, 1987

§ 102(e) Date: Aug. 3, 1987

[87] PCT Pub. No.: WO87/03661

PCT Pub. Date: Jun. 18, 1987

[30] Foreign Application Priority Data

Dec. 6, 1985 [DE] Fed. Rep. of Germany ....... 3543269

[51] Int. Cl.$^4$ .............................................. F16H 3/08
[52] U.S. Cl. ........................................ 74/358; 74/359; 74/331
[58] Field of Search .................. 74/357, 358, 359, 360, 74/331

[56] References Cited

U.S. PATENT DOCUMENTS

| | | | |
|---|---|---|---|
| 1,373,071 | 3/1921 | Hill | 74/358 X |
| 2,511,539 | 6/1950 | Orr | 74/331 |
| 3,451,285 | 6/1969 | Snyder | 74/364 |
| 4,226,135 | 10/1980 | Winter | 74/331 X |
| 4,476,737 | 10/1984 | Young | 74/331 X |

FOREIGN PATENT DOCUMENTS

| | | |
|---|---|---|
| 2535700 | 2/1977 | Fed. Rep. of Germany . |
| 3021489 | 12/1981 | Fed. Rep. of Germany . |
| 2137440 | 9/1983 | Fed. Rep. of Germany . |
| 2047360 | 11/1980 | United Kingdom . |
| 2079877 | 1/1982 | United Kingdom . |

Primary Examiner—Dirk Wright
Attorney, Agent, or Firm—Ostrolenk, Faber, Gerb & Soffen

[57] ABSTRACT

The invention provides a multi-gear ratio gearbox with a reverse. The gearbox is characterized by having a very short overall length. It has an input drive shaft (11) and an output shaft (12) in coaxial relationship, two counter shafts (13 and 14) arranged in parallelism thereto and furthermore groups of gear wheels mounted on these shafts, the gear wheels in such groups being placed in three gear wheel planes. The clutches for coupling the different gear wheels with their shafts are in a common plane which for its part is between the gear wheel planes. This arrangement leads to an extremely compact design of the gearbox, more particularly as regards its axial length so that the gearbox is specially well suited for combination with a coaxial change-speed transmission on the output side. If such further transmission is an epicyclic gearing unit the overall length will be within the length range of plain transmissions as so far proposed.

18 Claims, 2 Drawing Sheets

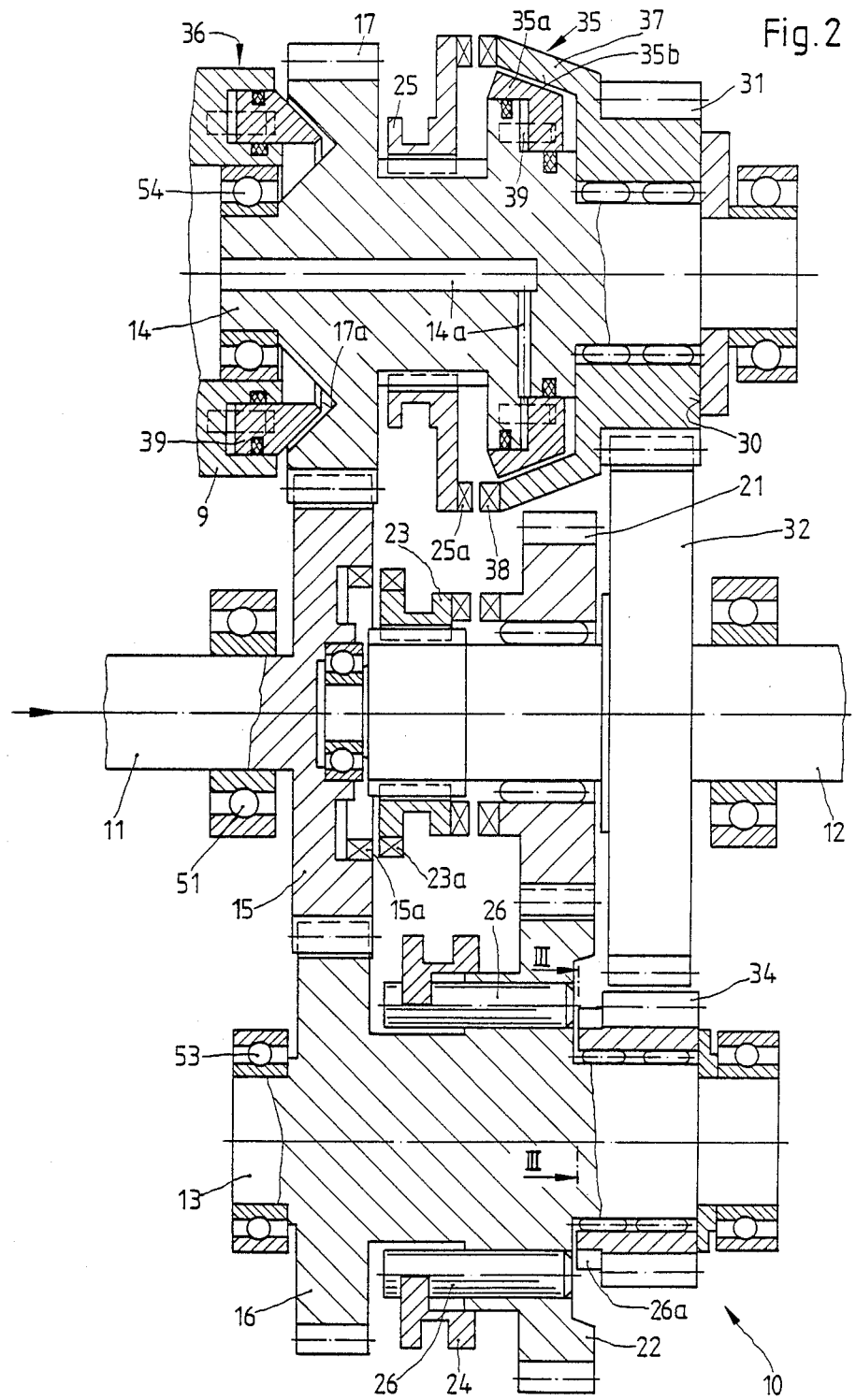

4,802,375

CHANGE-SPEED GEARBOX

BACKGROUND OF THE INVENTION

The invention relates to a change-speed gearbox providing three forward gear ratios and one reverse gear ratio wherein the gears in the gearbox are in three gear planes and the clutches are generally in one gear plane to reduce the axial length of the gear box. The invention is an improvement over the gear box described in Austrian pat. No. 51,824.

The present invention concerns a change-speed gearbox comprising an input drive shaft, and a coaxially arranged output shaft able to be coupled with it, and a number of non-coaxial counter shafts. A number of groups of meshing gear wheels are mounted on these shafts. For changing gear there are sliding clutches with interlocking engagement means. One of the change-speed clutches is available for directly coupling the output shaft with the input shaft. Each of the other clutches may be used for connecting a gear wheel with the shaft on which the gear wheel is bearinged so that in each case only those pairs of gear wheels are effective which in view of their diameter (and the number of teeth dependent on the diameter) are to be used for producing the desired transmission ratio.

Besides the coaxially arranged input and output shafts the prior change-speed gearbox has three counter shafts. The gear wheels are divided up into four groups so that there are thus four gear wheel planes, that is to say two front and two rear gear wheel planes. The clutches are all arranged in the center part of the gearbox, that is to say essentially in a so-called clutch plane placed between the second and third gear wheel planes. In connection with this known design attempts have already been made to make a compact design. However, the gearbox still had a comparatively long overall length because, as noted, four gear wheel planes are needed.

SUMMARY OF THE INVENTION

Accordingly one object of the present invention is to improve on a change-speed gearbox of the initially mentioned type so that it is an even shorter overall length. Furthermore measures are to be taken to have so-called central synchronisation without this again involving an increase in the overall length of the gearbox.

In order to achieve these objects a change-speed gearbox is modified to have a number of features.

The clutch includes a coaxial input and output shaft and separate non-coaxial first and second counter shafts. There are first, second and third groups of gear wheels in mesh with each other, and each of the gear wheel groups is in a respective gear wheel plane. There are five engageable clutch mechanisms selectively joining respective ones of each of the shafts with different ones of the gears in the three groups of gears, and this in turn establishes the three forward and one reverse gear ratios. The gears are either affixed on a respective shaft or are supported to rotate with a respective shaft. The clutches are themselves generally all in a common clutch plane which is disposed between two of the gear wheel planes. The clutches have particular respective individual designs for establishing the connection between the shafts and gears that the clutches connect, and that is detailed in the Detailed Description of the Preferred Embodiment. There is also a friction brake for braking the rotation of the gears selectively.

Since in accordance with the invention only three groups of gear wheels are required while at the same time the arrangement of the clutches is able to be in a single plane, there is minimum length of the gearbox in axial direction. More particularly, this smaller axial length makes it possible for epicyclic gearing to be connected with the output shaft (as has been proposed, see German pat. No. 2,137,440) to increase the number of gear ratios without this meaning that the size would be such as to make the gearbox unsuitable for incorporation in motor vehicles, for instance owing to the overall of the gear-box being excessive. A substantial advantage of the gearbox of the invention is thus to be seen in its ability to be combined with additional assemblies in order to increase the possible ratio range.

A feature of the particular value in this respective is that the clutch plane may be between the first and second gear wheel planes as part of the invention. It is an advantage in this case if the clutch element (which makes it possible to couple the reverse gear wheel with the counter shaft on which it is bearinged) extends through the counter wheel which is also keyed on this shaft.

A further reduction in the overall length of the gearbox is possible if it is not every clutch which has its own synchronizing device and there is instead so-called central synchronisation as described for example in the German unexamined specification DE-OS No. 3,021,489. Such central synchronisation involves on the one hand a slipping clutch for accelerating the transmission parts on the drive input side when changing down and on the other hand a brake for slowing down such transmission parts when changing up. In accordance with a further feature of the invention, the central synchonisation slipping clutch is arranged on the second counter shaft in the center gear wheel plane. At this position it then requires no further space. The brake is preferably arranged in the plane of the shaft bearings on the input drive side so that this does not cause any increase in the overall length of the gearbox either.

The invention will now be described in detail with reference to embodiment thereof as shown in the drawing by way of example only.

BRIEF DESCRIPTION OF THE DRAWINGS

FIG. 2 shows the mechanical design of the change-speed gearbox of FIG. 1.

DESCRIPTION OF THE PREFERRED EMBODIMENTS

Figure 1:
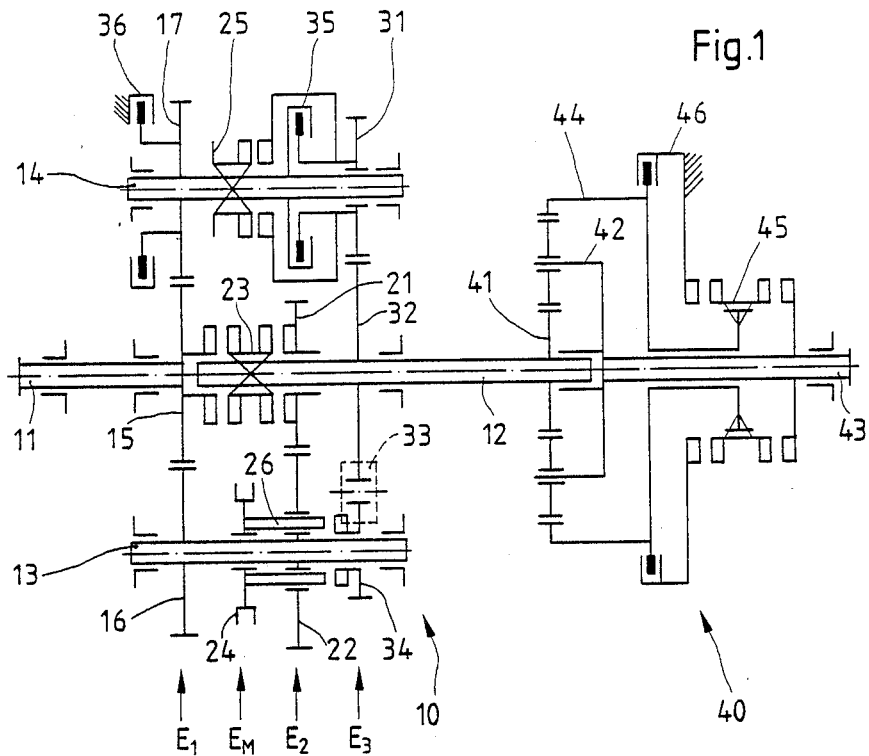
FIG. 1 diagrammatically shows a change-speed gearbox with a further transmission connected with its output shaft.

In FIGS. 1 and 2 show an input drive shaft 11 which is suitably bearinged and will normally be driven via a clutch which is not illustrated here. There is an output drive shaft 12 bearinged so as to be coaxial to the input drive shaft 11. The gearbox housing, which is not shown, also has bearings supporting a first counter shaft 13 and a second counter shaft 14 therein. A gear wheel 15 is keyed on the input drive shaft 11 so as to mesh with respective gear wheels 16 and 17, which in turn are keyed on the counter shafts 13 and 14, respectively. First and second output gear wheels 21 and 32, respectively, are mounted on the output drive shaft 12, the former, that is to say the gear wheel 21, being free to turn on the shaft 12, whereas the second one, that is to say the gear wheel 32, is keyed to the shaft. The freely rotatable first output gear wheel 21 meshes with a counter gear wheel 22 keyed to the counter shaft 13. The second output gear wheel is in mesh with a reversing gear wheel 33 (same being only shown in the diagrammatic figure 1) which for its part meshes with a gear wheel 34 bearinged on the counter shaft 13. Via a clutch 24 it is possible for this gear wheel 34 to be rotationally locked onto the counter shaft 13. On the other hand the second output gear wheel 32 is in mesh with a gear wheel 31 which is bearinged on the second counter shaft 14 with which it may be locked in rotation by means of a clutch 25.

A third clutch 23, which is in the form of a two-way clutch, makes it possible for the output shaft 12 to be selectively connected with the input shaft 11 or with the first output gear wheel 21 bearinged on the output shaft. The gear wheel 21 is in mesh with the counter gear wheels 22 mounted on the counter shaft 13. The displacement of the clutches 23, 24 and 25 is performed conventionally by shift forks which are not shown.

Figure 3:
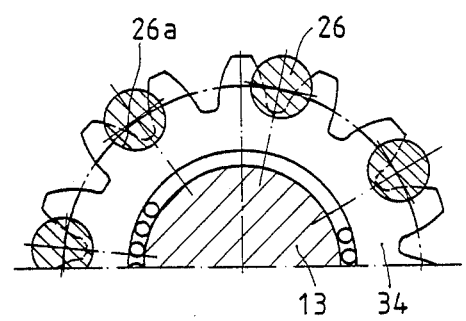
FIG. 3 is a partial cross section taken on the line III—III of FIG. 2.
Figure 3A:
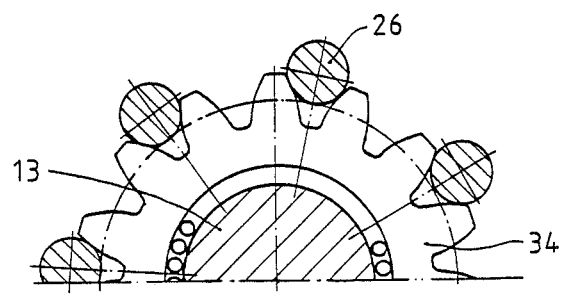
FIG. 3a shows a design as an alternative to that shown in FIG. 3.

The gear wheels 15, 16 and 17 are in a first gear wheel plane $E_1$, the gear wheels 21 and 22 in a second gear wheel plane $E_2$ and the gear wheels 31, 32, 33 and 34 in a third gear wheel plane $E_3$. As will be seen, the three clutches 23, 24 and 25 are all in one clutch plane $E_M$, which in the working example of the invention is between the first and second gear wheel planes $E_1$ and $E_2$. The clutch 24 for connecting the gear wheel 34 for reverse has at least three pins 26 extending through the counter wheel 22, such design making it possible to arrange the clutch 24 for reverse on the other side of the counter gear wheel 22 to the reverse gear wheel 34 so that the clutch 24 is in the same plane as the two other clutches 23 and 25, whereas the gear wheel 34 is in the outer gear wheel plane $E_3$. As will be seen from the FIGS. 3 and 3a, the pins 26 may be pushed by the clutch 24 in between the teeth of the gear wheel 34. As will be seen from FIG. 3 there are suitably designed recesses 26a between the teeth for the pins 26, whereas in accordance with FIG. 3a the pins are simply moved into the spaces between the teeth.

On the counter shaft 14 shown on the opposite side in the drawing there is a friction clutch 35 adapted to allow slip and which is in the power train between the counter shaft 14 and the gear wheel 31 for the first gear ratio, that is to say parallel to the dog clutch teeth of the clutch 25. If this dog clutch is disengaged and if, while the input clutch is disengaged, the friction clutch 35 is engaged, the gear wheel 31 meshing with the output gear wheel 32 will tend to accelerate the counter shaft 14 up to the same speed of rotation, that is to say on switching back to accelerate the input parts of the gearbox (the gear wheels 15, 16 and 17), in order to cause synchronisation on changing gear, that is to say equal speeds at the clutch which is to be engaged. In a similar manner a friction brake 36 provided on the counter shaft 14 has a braking effect on the gearbox parts on the input side when changing up. A detailed account of the synchronizing means is given further below.

In order to put the gearbox into first gear (i.e. so that it operates with the first gear ratio), the clutch 25 is engaged so that its dog teeth lock the gear wheel 31 with the counter shaft 14 in rotation, and for its part the counter shaft 14 is driven via the gear wheels 17 and 15 from the input drive shaft 11. The power train is then via the drive shaft 11 via the meshing gear wheels 15 and 17, the counter shaft 14 and the meshing gear wheels 31 and 32 to the output shaft 12. The two other clutches 23 and 24 are not engaged in this case. For putting the gearbox into second gear the clutch 23 is moved to the left so that the output shaft 12 is directly connected with the drive input shaft 11, that is to say the transmission of power takes place without changing the speed of rotation and with a "direct" or unity gear ratio. In this case the clutches 24 and 25 are not engaged. For putting the gearbox into third gear the clutches 24 and 25 are again not engaged and the clutch 23 is displaced to the right so that the output drive gear wheel 21 is locked onto the output drive shaft 12 and the power train from the input drive shaft 11 is via the meshing gear wheels 15 and 16, the counter shaft 13 and the gear wheels 22 and 21 to the output drive shaft 12. In order to put the gearbox into reverse gear the clutches 23 and 25 are left unengaged and via the clutch 24 and by means of the pins 26 extending through the counter wheel 22 the gear wheel 34 is locked to the counter shaft 13. The power train from the input drive shaft 11 is then via the meshing gear wheels 15 and 16, the counter shaft 13, the gear wheel 34, the reversing gear wheel 33 and the output gear wheel 32 to the output drive shaft 12, whose direction of rotation will now be the opposite to the direction of the input drive shaft 11 owing to the action of the reversing gear wheel 33.

The transmission as so far described with three forward and one reverse gear ratios may be amplified if required by having one or two additional gear wheel planes in order to increase the number of gear ratios. However, the preferred arrangement is that as shown in FIG. 1: The output drive shaft 12 of the change-speed gearbox 10 is coupled with a further gear system in the form of an epicyclic gear unit 40 including a sun wheel 41 keyed to the shaft 12, a planet gear wheel carrier 42 and an annulus 44 and whose output shaft 43 is coupled with the planet wheel carrier. Owing to the very short overall length of the change-speed gearbox 10, it is particularly suitable for use with such a epicyclic unit on the output side so that the number of gear ratios is doubled without the overall length of such gearing combination being greater than the likely typical length of conventional gearboxes. For operation of the epicyclic gearing unit 40 there is a two-way clutch 45, which rotates with the annulus 44 and may be coupled either with a stationary housing part 46 or with the output shaft 43. In the first-mentioned case the shaft 43 will rotate more slowly than the shaft 12 and in the second case the two shafts 12 and 43 will turn at the same speed.

A further advantage of the invention is to be seen in the fact that by simply interchanging only two gear wheels (as will be explained in what follows) the ratio steps of the gearbox are such that in a single series of gearboxes with different ratio sets it is possible to have a maximum number of common parts leading to a marked cost economy. For this purpose in the two power trains for the first gear ratio (gear wheels 17, 31 and 32) and for the third gear ratio (gear wheels 16, 22 and 21) it is only necessary to change the number of teeth of one wheel by having one more or one less tooth. As is known it is then possible to keep to the same center distance by displacing the profile and thus to leave all other gear elements unchanged.

As an example one may take as a starting point a basic gearbox design with the following number z of teeth and ratios i:

gear wheel 15: $z=30$
gear wheel 16: $z=27$
gear wheel 17: $z=29$
gear wheel 21: $z=24$
gear wheel 22: $z=33$
gear wheel 31: $z=23$
gear wheel 32: $z=36$ Then the transmission ratios $i_1$ and $i_3$, respectively, in the first and third gears will be as follows:
$29/30 \cdot 36/33 = 1.513$ and
$27/30 \cdot 24/33 = 0.655$.

Since the transmission ratio ($i_2$) in second gear is unity, there will be the following even relationships between gear ratios:
$i_1/i_2 = 1.513 : 1 = 1.513$
$i_2/i_3 = 1 : 0.655 = 1.527$
and an overall relationship ($i_1/i_3$) of 2.31.

For example by reducing the numbers of teeth of the gear wheels 21 and 31 by one tooth in each case the ratios $i_1$ and $i_3$ will now become:
$29/30 \cdot 36/22 = 1.582$ and
$27/30 \cdot 23/33 = 0.627$, respectively.

With a good degree of approximation the relationships between ratios are then still:
$i_1/i_2 = 1.582 : 1 = 1.582$, and
$i_2/i_3 = 1 : 0.627 = 1.595$,
but however the overall relationship ($i_1/i_3$) is $1.582/0.627 = 2.53$.

It is thus possible to adapt the change-gear gearbox to different applications, as for example to different vehicle weights or different engine horsepowers, in a relatively inexpensive manner.

For synchronisation when changing down the gearbox parts on the input side, that is to say the drive shaft 11, the gear wheels 15, 16 and 17 in the first gear wheel plane E1 and the respective counter shafts 14 and 16 have to be speeded up to the speed corresponding to the lower gear before the teeth of the respective clutch may be engaged. This acceleration is caused by the output shaft 12 via the gear wheels 32 and 31 which lead to the greatest transmission ratio between the output shaft 12 and the counter shaft 14. For synchronisation the friction clutch 35 is engaged by pressing on the rear side of the clutch part 35a in the design shown in FIG. 2 in detail. This clutch part 35a is locked in rotation with the counter shaft 14 by means of pins 39 and it has a conical surface. The latter makes frictional engagement with the conical inner surface of the bell-like clutch part 37 which is locked in rotation with the gear wheel 31 so that its motion is transmitted to the counter shaft 14. The latter is accelerated to a certain speed of rotation as determined by the output shaft 12 and the transmission ratio between the gear wheels 32 and 31. When the counter shaft 14 is running at the same speed as the gear wheel 31, it is then possible for the dog clutch teeth 25a of the clutch also rotating at the same speed as the counter shaft 14 to be engaged with the dog clutch teeth 38 on the left hand end of the clutch part 37 so that the gearbox will now be in first gear.

On changing down from third (involving gear wheels 21 and 22) to the second direct or unity ratio gear, synchronisation of the clutch 23 with the drive shaft 11 also takes place via the friction clutch 35, which by accelerating the counter shaft 14 also accelerates the drive shaft 11 via the gear wheels 15 and 17 so that the left hand dog clutch teeth 23a of the clutch 23 locked in rotation with the output drive shaft 12 are able to be engaged with the opposite clutch teeth 15a of the gear wheel 15 locked in rotation with the input drive shaft 11 and the drive shaft 11 is directly connected with the output drive shaft 12.

As will be seen from FIGS. 1 and 2 the friction clutch 35 on the counter shaft 14 is arranged in a gap present in the gear wheel plane E2 occupied by the gear wheels 21 and 22, which is opposite to the gear wheel 22 mounted on the other counter shaft 13. As a result the synchronizing friction clutch 35 does not necessitate any increase in the overall length of the gearbox. In the example shown the engagement of the friction clutch 35 is caused by power fluid supplied through holes 14a in the counter shaft 14, although the invention also contemplates other possibilities of actuation. Furthermore, in place of the conical clutch 35 it would be possible have a plate clutch.

While on changing to a lower gear, acceleration of the gearbox parts on the input drive side is necessary in relation to the output drive shaft 12 for synchronisation, such parts have to be slowed down in relation to the output shaft 12 when changing gears up. For this purpose there is a friction brake 36 which is able to brake the counter shaft 14. A conical surface 17a on the gear wheel 17 fixed on the counter shaft 14 cooperates with a conical opposite surface on a brake ring 39, which is bearinged in an annular cylinder part 9 of the cover of the housing of the gearbox and may also be pressed by fluid under pressure against the conical surface 17a. The arrangement of the conical surface 17a extending into the gear wheel 17 and the bearing means of the brake ring 39 with its drive in a cover of the housing of the transmission also leads to a compact arrangement, which does not, practically speaking, involve any increase in the axial length of the transmission, since the brake ring 39 is in the same plane as that in which the input drive side bearings 51, 53 and 54 for the shafts 11, 13 and 14 are arranged. In the working example shown it possible to see that there is a further friction surface 30 to the right of the gear wheel 31 on which the gear wheel 31 runs so that there is an additional frictional moment, this saving one axial bearing.

I claim:

1. A change-speed gearbox for providing at least three forward gear ratios and one reverse gear ratio, the gearbox comprising:

the gearbox having a central gearbox axis, an input drive shaft on the gearbox axis for delivering input drive; an output drive shaft on the gearbox axis for being driven; a first clutch between the input drive shaft and the output drive shaft and engagement of the first clutch producing a first one of the forward gear ratios;

a first and a second counter shaft spaced from the gearbox axis and each counter shaft being rotatable independently of the output drive shaft;

a first gear wheel group including a first gear on and rotatable with the input drive shaft, a second gear on and rotatable with the first counter shaft and the first and second gears being in mesh; a third gear on and rotatable with the second counter shaft, the first and third gears being in mesh, with the second and third gear being out of mesh; the gears of the first gear wheel group all being arranged in a first gear wheel plane across the input shaft;

a fourth output gear supported on and rotatable with respect to the output drive shaft; a second clutch which is engageable for joining the output drive shaft and the fourth output gear for rotation together; a fifth output gear supported on and rotatable with the first counter shaft and in mesh with the fourth output gear for rotating therewith and for defining a second one of the forward gear ratios; the fourth and fifth gears define a second gear wheel group which are in a second gear wheel plane across the gearbox axis and axially spaced from the first gear wheel plane;

a sixth output gear is supported on and rotatable with respect to the second counter shaft; a third clutch engageable between the second counter shaft and the sixth gear for coupling them to rotate together;

a seventh gear on the output drive shaft and rotatable together therewith, the sixth and seventh gears being in mesh for rotating together and for defining a third one of the forward gear ratios;

an eighth, reversing gear in mesh with the seventh gear for rotation therewith;

a ninth, reversing gear supported on and rotatable with respect to the first counter shaft and being in mesh with the eight gear; a fourth clutch engageable for coupling the fifth gear on the first counter shaft with the ninth gear for defining the reverse gear ratio;

the sixth, seventh, eighth and ninth gears being in a third gear wheel group located in a third gear wheel plane across the gear box axis and axially spaced from the first and the second gear wheel planes.

2. The gearbox of claim 1, wherein all of the second, third and fourth clutches are in a common clutch plane and the first clutch is in substantially the first clutch plane.

3. The gearbox of claim 2, wherein the clutch plane is arranged along the gearbox axis between the first and second bear planes.

4. The gearbox of claim 1, wherein the first and second clutches are each comprised of a common movable clutch element, movable in a first direction generally along the gearbox axis for engaging the input and output drive shafts to define the first clutch and movable in a second direction generally along the gearbox axis for engaging the fourth gear and the output drive shaft to define the second clutch.

5. The gearbox of claim 3, wherein the fourth clutch for reverse gear comprises a clutch element extending generally parallel to and movable generally parallel to the axis of the first counter shaft, a respective recess in the fifth gear for receiving the clutch element as it moves along the axis of the first counter shaft, the ninth reverse gear having recesses each for receiving the clutch element from the fourth clutch extending through the recess in the fifth gear and into one of the recesses in the ninth gear, whereby with the clutch element positioned in the recesses of the fifth and ninth gears, those gears are rotatable together for rotating the first counter shaft.

6. The gearbox of claim 5, wherein the ninth reverse gear is a toothed gear with gaps between the teeth and the recesses of the ninth gear comprise the gaps between the teeth thereof.

7. The gearbox of claim 1, further comprising a fifth friction clutch on the second counter shaft generally in the second gear plane and disposed between the sixth gear, which meshes with the seventh gear of the third one of the gear ratios, and the second counter shaft, for accelerating the input drive shaft, the first counter shaft, the second counter shaft, and the first, second and third gears on changing of the gear ratio;

a friction brake for braking the mentioned accelerated parts of the gearbox.

8. The gearbox of claim 7, further comprising bearings with axial positions at the input drive shaft side of the gearbox, respective ones of those bearings being provided for the input drive shaft, the first counter shaft and the second counter shaft, and those bearings generally being in a single plane, the friction brake also being in the single plane.

9. The gearbox of claim 7, wherein the fifth clutch is locked to the sixth gear for rotating therewith and the fifth clutch includes a first friction surface; a cooperating second friction surface defined on the second counter shaft; the first and second friction surfaces being movable together and apart, with their movement together locking the sixth gear to rotate with the second counter shaft.

10. The gearbox of claim 9, wherein the fifth clutch further comprises additional means for connection between the second counter shaft and the fifth clutch, the additional means including an element supported for rotation around and together with the second counter shaft, and that element having first engageable means, and the fifth clutch including second engageable means for being engaged by the first engageable means which is movable thereagainst, whereby there are two separate ways in which the sixth gear is engaged with the second counter shaft through the fifth clutch.

11. The gearbox of claim 10, wherein the first friction surface on the fifth clutch is a conical inner surface and the second friction surface comprises a cooperatingly conical outer surface on the second counter shaft and the second friction surface being movable toward and away from the first friction surface along the second counter shaft.

12. The gearbox of claim 11, wherein the first friction surface is located between the sixth gear and the first engageable means.

13. The gearbox of claim 9, wherein the first friction surface on the fifth clutch is a conical inner surface and the second friction surface comprises a cooperatingly conical outer surface on the second counter shaft and the second friction surface being movable toward and away from the first friction surface along the second counter shaft.

14. The gearbox of claim 7, comprising a housing within which the gearbox is disposed; the brake is supported stationary to the gearbox housing; the brake includes a friction surface, and the friction surface of the brake is movable into and out of engagement with one of the gears located in the first gear wheel group.

15. The gearbox of claim 8, comprising a housing within which the gearbox is disposed; the brake is supported stationary to the gearbox housing; the brake includes a friction surface; and the friction surface of the brake is movable into and out of engagement with one of the gears located in the first gear wheel group;

and wherein it is the friction surface of the brake that is generally in the same plane as the shaft bearings.

16. The gearbox of claim 15, wherein the friction surface of the brake is engageable with the third gear on the second counter shaft.

17. The gearbox of claim 14, wherein the gear is the first gear wheel group engageable by the friction surface of the brake includes a conically shaped friction surface extending into that gear along the direction of the axis of that gear, and the friction surface of the brake is correspondingly conically shaped for engagement therewith.

18. The gearbox of claim 1, wherein the first one of the forward gear rotation ratios is a unity ratio and is second gear of the gearbox; the second one of the forward gear rotation ratios is the third gear of the gearbox; and the third one of the forward gear rotation ratios is the first gear of the gearbox.

* * * * *